US012306790B2

(12) United States Patent
Dockter

(10) Patent No.: US 12,306,790 B2
(45) Date of Patent: May 20, 2025

(54) DATA MIGRATION USING COUNTER HASHING

(71) Applicant: Oracle International Corpration, Redwood Shores, CA (US)

(72) Inventor: Caleb Dockter, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/081,285

(22) Filed: Dec. 14, 2022

(65) Prior Publication Data

US 2024/0202161 A1     Jun. 20, 2024

(51) Int. Cl.
| | |
|---|---|
| *G06F 16/10* | (2019.01) |
| *G06F 16/11* | (2019.01) |
| *H04L 9/06* | (2006.01) |
| *H04L 9/32* | (2006.01) |

(52) U.S. Cl.
CPC .......... *G06F 16/119* (2019.01); *H04L 9/0618* (2013.01); *H04L 9/3239* (2013.01)

(58) Field of Classification Search
CPC .................................................. G06F 16/119
USPC ........................................................ 707/809
See application file for complete search history.

(56) References Cited

U.S. PATENT DOCUMENTS

| | | | |
|---|---|---|---|
| 12,192,183 B1* | 1/2025 | Kerr | H04L 12/66 |
| 2018/0137062 A1* | 5/2018 | Awad | G06F 12/0802 |
| 2021/0303519 A1* | 9/2021 | Periyagaram | G06F 16/17 |
| 2023/0230091 A1* | 7/2023 | Vaughn | G06Q 20/4016 |
| | | | 705/71 |

* cited by examiner

*Primary Examiner* — Belix M Ortiz Ditren
(74) *Attorney, Agent, or Firm* — Kilpatrick Townsend & Stockton LLP

(57) ABSTRACT

Techniques described herein are directed toward a counter hash generation scheme. One embodiment includes a method for counter hash generation. The method includes a device receiving an instruction to transmit an artifact from a source system to a target system, the artifact comprising a plurality of blocks. The device receives a block from the source system. The device generates an initialization vector based at least in part on the artifact. The device generates a nonce based at least in part on the initialization vector and a block value, each block being assigned a respective block value by a counter. The device generates a combined data instance based at least in part on a combination of the nonce, data of the block, and a length of the block. The device generates a hash of the combined data instance. The device transmits the hash and the block to the target system.

20 Claims, 10 Drawing Sheets

DATA MIGRATION USING COUNTER HASHING

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud services provider can offer on-demand services.

BRIEF SUMMARY

Embodiments described herein are directed toward a counter hash generation scheme. One embodiment includes a method executing a counter hash generation scheme. The method includes a computing device receiving an instruction to transmit an artifact from a source system to a target system, the artifact comprising a plurality of data blocks.

The method further includes the computing device receiving a data block of the plurality of data blocks from the source system.

The method further includes the computing device generating an initialization vector based at least in part on the artifact.

The method further includes the computing device generating a nonce based at least in part on the initialization vector and a data block value, each data block of the plurality of data blocks being assigned a respective block value by a counter.

The method further includes the computing device generating a combined data instance based at least in part on a combination of the nonce, data of the data block, and a length of the data block.

The method further includes the computing device generating a hash of the combined data instance by using a hash function.

The method further includes transmitting the hash and the data block to the target system.

Embodiments can further include a computing device, including a processor and a computer-readable medium including instructions that, when executed by the processor, can cause the processor to perform operations including receiving an instruction to transmit an artifact from a source system to a target system, the artifact comprising a plurality of data blocks.

The instructions that, when executed by the processor, can further cause the processor to perform operations including receiving a data block of the plurality of data blocks from the source system.

The instructions that, when executed by the processor, can further cause the processor to perform operations including generating an initialization vector based at least in part on the artifact.

The instructions that, when executed by the processor, can further cause the processor to perform operations including generating a nonce based at least in part on the initialization vector and a data block value, each data block of the plurality of data blocks being assigned a respective block value by a counter.

The instructions that, when executed by the processor, can further cause the processor to perform operations including generating a combined data instance based at least in part on a combination of the nonce, data of the data block, and a length of the data block.

The instructions that, when executed by the processor, can further cause the processor to perform operations including generating a hash of the combined data instance by using a hash function.

The instructions that, when executed by the processor, can further cause the processor to perform operations including transmitting the hash and the data block to the target system.

Embodiments can further include a non-transitory computer-readable medium including stored thereon instructions that, when executed by a processor, causes the processor to perform operations including receiving an instruction to transmit an artifact from a source system to a target system, the artifact comprising a plurality of data blocks.

The instructions that, when executed by the processor, can further cause the processor to perform operations including receiving a data block of the plurality of data blocks from the source system.

The instructions that, when executed by the processor, can further cause the processor to perform operations including generating an initialization vector based at least in part on the artifact.

The instructions that, when executed by the processor, can further cause the processor to perform operations including generating a nonce based at least in part on the initialization vector and a data block value, each data block of the plurality of data blocks being assigned a respective block value by a counter.

The instructions that, when executed by the processor, can further cause the processor to perform operations including generating a combined data instance based at least in part on a combination of the nonce, data of the data block, and a length of the data block.

The instructions that, when executed by the processor, can further cause the processor to perform operations including generating a hash of the combined data instance by using a hash function.

The instructions that, when executed by the processor, can further cause the processor to perform operations including transmitting the hash and the data block to the target system.

DETAILED DESCRIPTION

Figure 1:
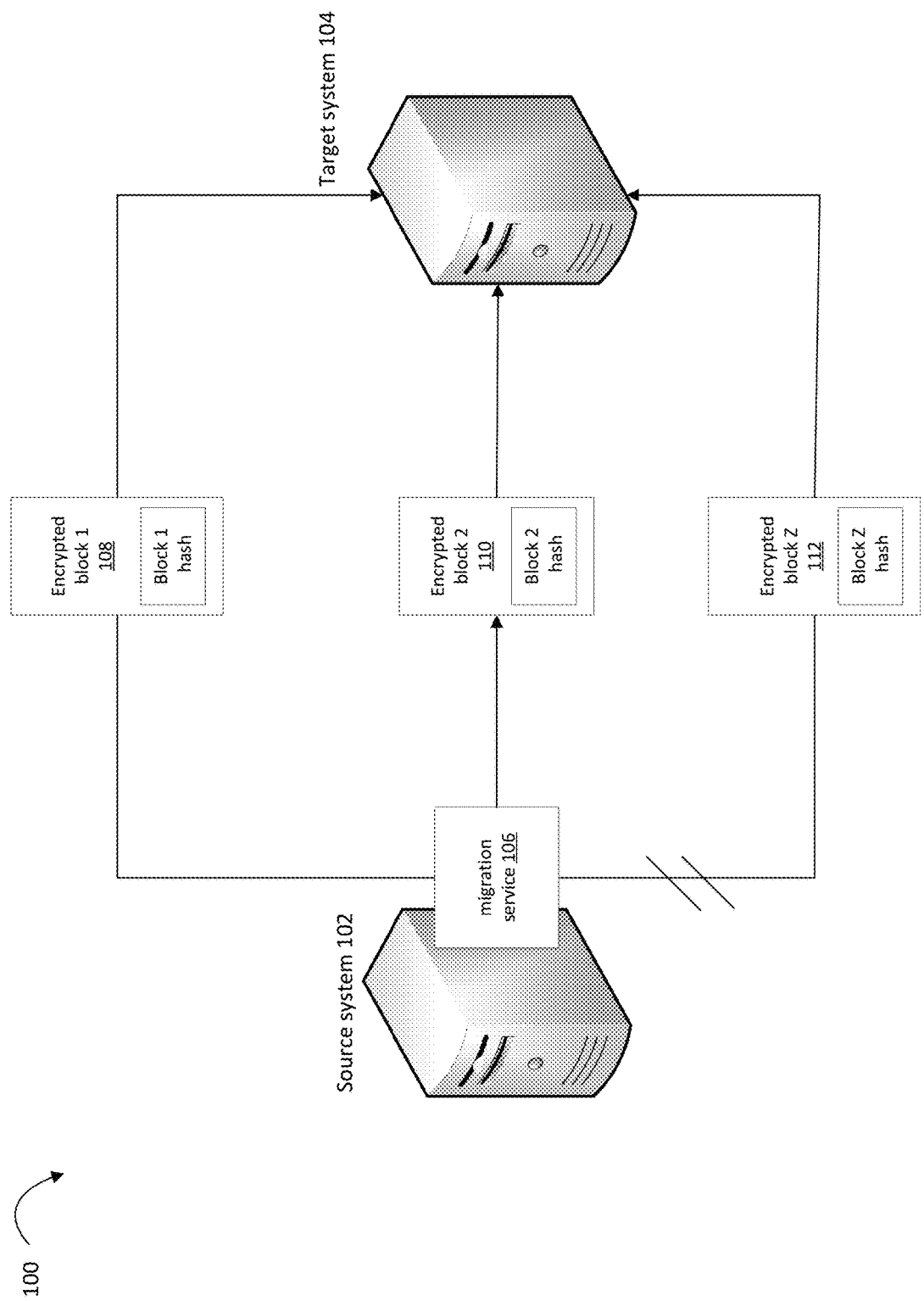
FIG. 1 is an illustration of data migration using a counter hash generation scheme, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud computing systems include services that can transfer an artifact from a source system to a target system. An artifact can be a software package, a library, a zip file, or other file. A migration service can be a service of the cloud computing system that can export the artifact from the source system and into a target system. Artifacts can be massive in size (e.g., terabytes worth of data), and therefore the migration service can subdivide the artifact into blocks of data. The migration service can further initialize a set of virtual machines that can each export respective blocks from the source system to the target system. The target system can reconstruct the artifact from the blocks.

The target system can require that the artifact's cryptographic integrity be verified before the transfer completes and the artifact becomes available in the target system. To satisfy the verification requirement, prior to being transmitted each of the data blocks, the migration service can verify the integrity of the artifact by, for example, checking for viruses, verifying that the artifact creator is authorized to create the artifact, and other appropriate measures. Once verified, the migration service can include an attestation to the provenance of the artifact. However, the attestation is limited in that it can only provide verification up to the point that the artifact is transmitted to the target system. In other words, an adversary can enact one or more attacks on the artifact data as it is being transmitted from the source system to the target systems Example forms of these attacks include a block order swap, in which an adversary reorders data blocks; a block hash collision, in which an adversary generates a new block with the same hash as an original block; length extension, in which an adversary add contents to an existing block; pre-image, in which an adversary builds a lookup of multiple blocks which map to the same hash so that they can be swapped; chosen-prefix collision, in which an adversary generates a duplicate hash by appending arbitrary bytes to malicious content; and block hash negation, in which an adversary in which an adversary replaces one block with malicious content and then generates arbitrary bytes in other blocks. As illustrated, each of these attacks can manipulate the data blocks after they are transmitted from the source system and in transit to the target system. Furthermore, a target system relying on the attestation generated at the source system can be misled as to the provenance of the received artifact.

Currently, migration services cannot retrieve cryptographic identifiers (e.g., hashes) for an artifact's source. These migration services do not include a consistent cryptographic identifier that can be verified without first downloading and serially processing all the bytes of an artifact. Therefore, a cloud computing service's gated deployment policies cannot reliably verify that a received artifact is approved for a target system before downloading or serially processing all the bytes of the artifact.

Embodiments described herein address the above reference issues by using a counter (CTR) mode technique for migrating data from a source system to a target system. CTR hashing can allow for an arbitrary number of byte streams to be processed in any order and then the results to be aggregated together, resulting in a unique and durable cryptograph identity which can be suitable to verify the integrity of the full artifact. A migration service can receive instructions include an identity of a source system, an identity of an artifact stored at the source system, an identity of a target system, and instructions to migrate the artifact from the source system to the target system. The migration service can divide the artifact into chunks, in which a chunk is a smaller and more manageable section of the artifact. Each of the chunks can further be divided in blocks, in which each block is smaller and more manageable section of a chunk. For each block, an encryption service can generate a cryptographic identifier by combining plaintext with a nonce, where the nonce can be generated using information from an initialization vector and a counter value. In a stream of blocks being migrated from a source system to a target system, each block's counter value can be calculated without use of information from a previous block in the stream. Each block identifier can be calculated using the block's size and a byte offset from the start of the full byte stream. The herein described approach offers a variety of advantages. The artifact can be subdivided into plaintext blocks that can be processed by virtual machines in any order. A hash function can be applied to blocks of data, and the resulting hash values can be combined to generate a global artifact hash. This global artifact hash can be used by the target system to verify the source system's attestation of the blocks. The above mentioned plaintext blocks can be processed in arbitrary chunk sizes if the sizes align with the block sizes. The herein described embodiments are resistant to block reordering and length extension attacks by malicious actors.

FIG. 1 is an illustration of a data migration using a counter hash generation scheme, according to one or more embodiments. A cloud computing provider can receive instructions to migrate data from a source system 102 to a target system 104. The cloud computing provider can use a migration service 106 to migrate the data from the source system 102 to the target system 104. The source system 102 can be, for example, a computing device, such as a server, that can receive and process requests from a network using a cloud computing infrastructure. The source system 102 can be operable to employ one or more host devices (e.g., virtual machines) to assist with the migration of the artifact to the target system 104. The artifact can include data, such as a distribution package, reports, data structures, and log files. The artifact can be, for example, a deployable software that is the output of a build system.

The migration service 106 can use a counter hashing technique to generate hashes for blocks of data transmitted from the source system 102 to the target system 104. The migration service 106 can generate a hash for one block without regard to a hash for another block. The counter hashing technique can further allow the migration service 106 to generate the hash for the blocks out of order.

The embodiments described herein can be used to generate a hash for one block without having to wait for a hash of another block. For example, the migration service 106 can employ a virtual machine to use a hash function and generate a hash of a first block, while, in parallel, using another virtual machine to generate a hash for a second block. Furthermore, the migration service 106 does not need to wait for the hash of the first block to use a hash function to generate a hash for the second block, or vice versa.

The migration service 106 can receive a set of blocks (e.g., block 1, block 2, and block Z) from a source system 102. The migration service 106 can further generate an initialization vector that is common to the set of blocks. The initialization vector itself can be a random or pseudorandom number that the migration service 106 can use to generate a respective nonce for each block of the set of blocks.

To generate the respective nonce, the migration service 106 can employ a counter that can generate a value (e.g., number) for each block. The block values can be non-repeating and sequential. Additionally, the values can be ascending (e.g., 0, 1, 2, 3, . . . , Z-1) or descending (e.g., Z-1, . . . 3, 2, 1, 0). For example, if the artifact is subdivided into three blocks, the counter can assign a value of one for the first block, a value of two for the second block, and a value of three for the third block. The migration service 106 can then use the block value to generate a respective nonce for each block. The counter value can assume many forms. For example, each block can be indexed and the value and be an index value, an offset from a common starting memory address, or other appropriate value. At the target system, the value can be used to determine the sequence by which the blocks were disassembled from the artifact, and the sequence by which they are to be reassembled to reform the artifact. For example, consider an artifact that includes lines of code that need to be executed in order. If the artifact is disassembled into blocks, in which each block includes a portion of the code, the blocks need to be reassembled in the same order to preserve the ordering of the lines of code.

The migration service 106 can further combine each nonce with respective block data to generate combined data. Using the above example, for the first block, the migration service 106 can combine the first nonce with the first block data and any other appropriate data to generate a combined data instance. The migration service 106 can further combine a second nonce with second block data and any other appropriate data to generate a second combined data instance. The migration service 106 can also combine a third nonce with third block data and any other appropriate data to generate a third combined data instance. As indicated above, each of these processes can be performed in parallel, such that the migration service 106 does not need to wait to generate the combined data instance for one block before beginning to generate a combined data instance for another block.

The migration service 106 can further respectively apply a hash function to each combined data instance to output a respective hash for each block. Continuing with the example from above, for each of the three combined data instances, the migration service 106 can generate a respective hash. The three hashes can be processed to generate an artifact hash.

The migration service 106 can further encrypt each block to convert the blocks from plaintext to ciphertext (e.g., encrypted block 1 108, encrypted block 2 110, and encrypted block Z 112). Each of the blocks is described as encrypted, however, the herein described embodiments can be applied to encrypted or unencrypted transmissions. The migration service 106 can transmit the encrypted block 1 108, encrypted block 2 110, and encrypted block Z 112, along with their respective hashes to the target system 104. The target system 104 can be configured with the same hash algorithm and encryption algorithm used by the source system 102. The target system 104 can further generate hash values using the same hash function for each block and perform an operation to determine whether the hashes match. If the hashes match, the target system 104 can determine that a source system attestation to the integrity of the blocks valid. If, however, the result indicates that the hashes do not match, the target system 104 can determine that the source system's attestation is invalid and prevent the artifact from being installed at the target system 104. At the target system, the herein described embodiments can be used to support out-of-order asynchronous receipt of the blocks.

Figure 2:
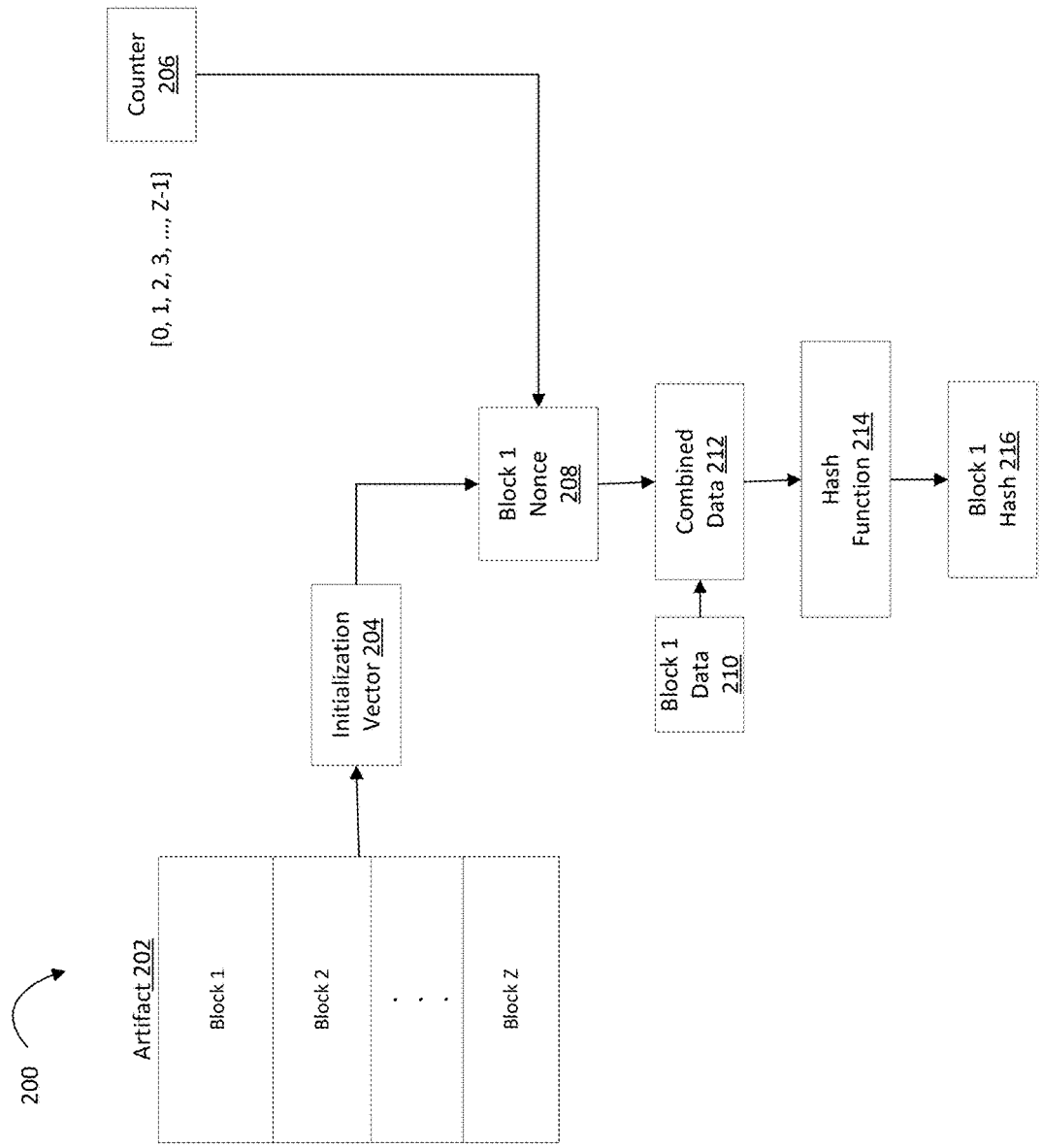
FIG. 2 is an illustration of a counter hash generation scheme, according to one or more embodiments.

FIG. 2 is an illustration 200 of the counter hash generation scheme, according to one or more embodiments. A migration service can receive instructions to transmit an artifact 202 from a source system to a target system. The migration service can be a service of a cloud computing provider and be executed by one or more computing devices. For example, the cloud computer provider can include a migration server comprised of one or more computing devices as part of the cloud computing infrastructure.

It should be appreciated that FIG. 2 is illustrated, the artifact 202 includes z number of blocks of data (as illustrated, block 1, block 2, and block a x) that are to be migrated from a source system to a target system. Each block can be a block of the artifact 202, for which the migration service can generate a hash without using hashing information of another block. For illustration and brevity, the hash generating process of a first block of data is described. It should be appreciated that migration service can follow the same steps for each other block of the artifact 202.

The migration service can receive instructions to migrate the artifact 202 from a source system to a target system. The migration service can further subdivide the artifact 202 into z number of blocks. The migration service can further initialize a set of virtual machines to process each of the blocks. As described herein, when a process executed by the migration service is described, it should be appreciated that the process steps can be performed by a virtual machine. The migration service can then calculate an initialization vector 204, which can be a random or pseudorandom and nonrepeating value. The initialization vector 204 can be known to the migration service, source system and the target system. In other words, the initialization vector 204 does not need to be kept a secret. The migration service can generate the initialization vector 204 based on, for example, an artifact name and an artifact version. The artifact name can be an identifier, such as a numeric identifier for the artifact. The artifact version can include, for example, a date the artifact was last modified. For example, the migration service can concatenate an artifact name and an artifact version to generate the initialization vector 204.

The migration service can then use a counter 206 to generate a nonce. The counter can be a global counter that is shared by all virtual machines. In this sense, the global counter can generate values that are unique, non-repeating, and sequential values. For example, if more than one counter is used, a counter could potentially generate a value for one block and another counter could generate the same value for another block. It should be appreciated that the global counter can generate the value (e.g., block identifier) for one block independently from another block's value. In other words, the global counter can generate the value for one block without receiving an input or derived value as to a previous block's value. As indicated above, the artifact 202 can be subdivided into Z number of blocks. Each block can be sequentially numbered to permit the target system to reassemble the artifact in the correct order. The ordering number can be generated by the counter 206. For example, for Z number of blocks, the counter 206 can generate a non-repeating value $[N_0]$-$[N_{z-1}]$ for each block. The migration service can rely on the counter 206 to generate the values to prevent duplicate nonces assigned to more than one data block. For example, if the artifact 202 is subdivided into three blocks, the counter 206 can assign a value of one for the first block, a value of two for the second block, and a value of three for the third block. The value can correspond to a position of the block with respect to the artifact 202. The target system can then reassemble artifact using the order of the values. For example, at the target system, the first block can be followed by the second block, which can be followed by the third block to reassemble the artifact 202.

The migration service can then generate a block 1 nonce (e.g., number once used) 208 based on the initialization vector 204 and the value generated by the counter 206. For example, the block 1 nonce 208 can be a concatenation of the initialization vector 204 and the value generated by the counter 206. As each block is assigned a different value by the counter 206, each block of the set of blocks can be assigned a different nonce by the migration service.

It should be appreciated that the migration service can process the blocks in any order in relation to the other blocks. Although block 1 being described, once the counter 206 has assigned a value, the migration service can process the blocks in any order. This is enabled due to migration service being able to use a hash function to generate a hash for one block without having to rely on a hashing information from another block.

After the block 1 nonce 208 is generated, the migration service can then combine data, including the nonce 208, the block 1 data 210, and a value indicating the size of the block 1 data to create a combined data 212. For example, the migration service can concatenate the block 1 nonce 208, the block 1 data 210, and a value indicating the size of the block 1 data to create the combined data 212. The migration service can create a combined data instance for each of the blocks (e.g., block 1 through block Z). Presumably, but not always, each block can be the same size, but include different data. However, even if two blocks include duplicate data and are the same size, due to the value generated by the counter 206, each block would be associated with a different nonce. Therefore, the migration service can create a different combined data instance for each block of the artifact 202.

The migration service can generate a hash for the combined data 212 using a hash function 214. The hash function 214 can receive an input (e.g., combined data 212) and output a fixed length string. The migration service can use various types of hash functions, for example, the hash function can be deterministic, in which the hash value remains the same for an input. Therefore, no matter the number of times that an input is entered into the hash function, the output is the same. Additionally, if the one input is different than another input, each input will cause the hash function to generate a different hash value. In some embodiments, the hash function 214 can be a secure hash algorithm (e.g., SHA-3), which can include any of a family of cryptographic hash functions. It should be appreciated that the migration service can generate each block (e.g., block 1-block Z) without hashing information from a previous block. For example, the migration service can generate a hash for block 2 using the hashing function without receiving any hashing information related to block 1. The hash function used for each block (e.g., block 1-block Z) can be the same hash function that is known by the source system, the migration service, and the target system.

The output of the hash function 214 can be a block 1 hash 216 (e.g., a fixed length string, hash value, checksum). For the blocks created from the artifact 202, each block hash can be based on a combined data instance (e.g., combined data 212). Each combined data instance can include a combination of a nonce, block data, and block length. Each nonce can be generated from an initialization vector and value generated by the counter 206, such that each block is assigned a different nonce. Therefore, each combined data can, at least, be distinguished based on the nonce. As each combined data instance is different, the hash function will generate a different hash for each block. For example, the migration service can use the hash function 214 to generate the block 1 hash 216 for block 1 of the artifact 202. The migration service can use the same hash function to generate a hash for block 2 of the artifact 202. As the nonce (e.g., block 1 nonce 208) for block 1 is different than the nonce (e.g., block 2 nonce) for block 2, the hash that results from hashing the block 1 combined data (e.g., combined data 212) is different than the hash that results from hashing a block 2 combined data.

Figure 3:
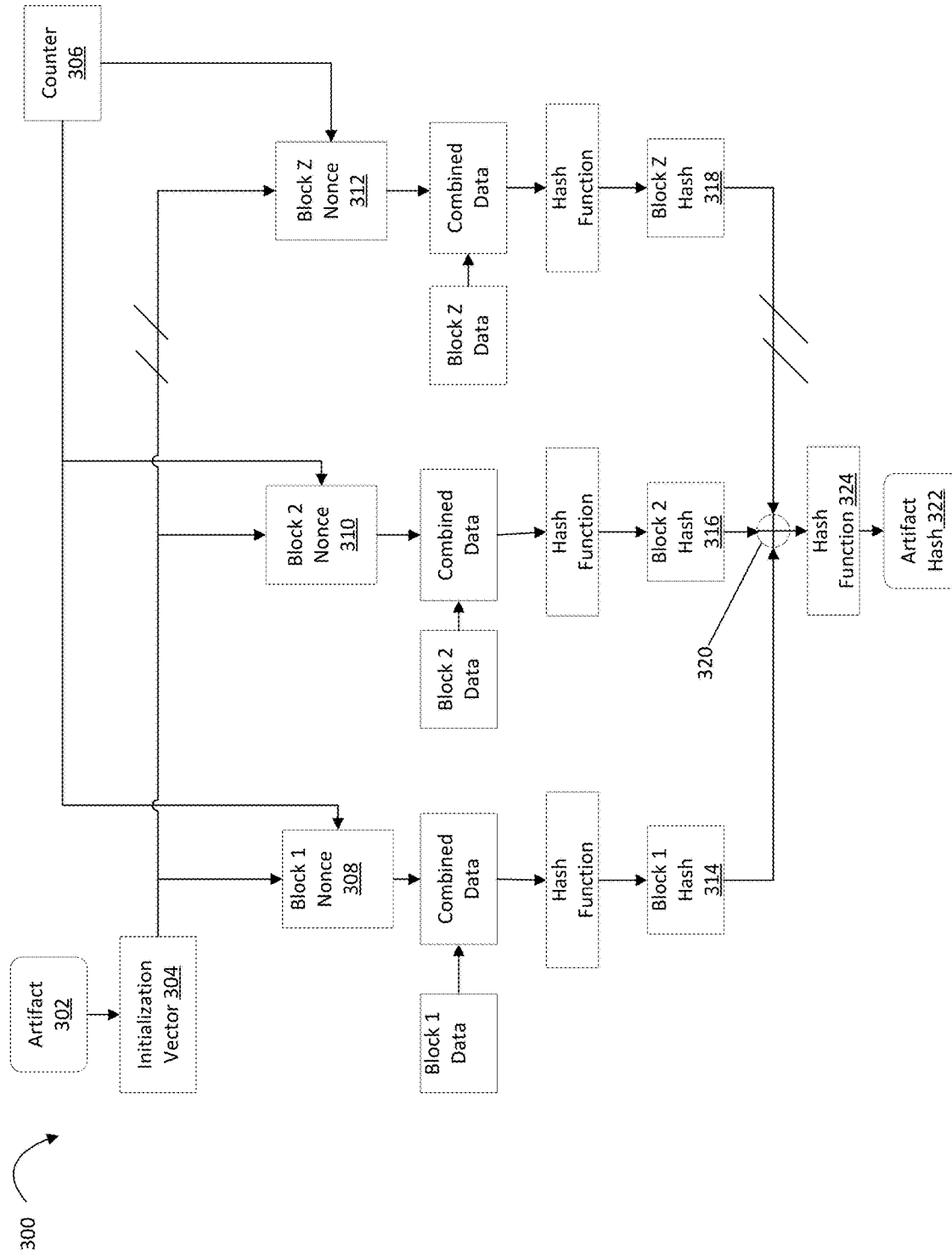
FIG. 3 is an illustration of a counter hash generation scheme, according to one or more embodiments.

FIG. 3 is an illustration 300 of the counter hash generation scheme, according to one or more embodiments. A migration service can receive instructions to migrate an artifact 302 from a source system to a target system. The artifact can be divided into chunks, which are further divided into blocks (e.g., block 1, block 2, to block Z). The migration service can generate an initialization vector 304 that can be used to generate a nonce for each of the blocks. As illustrated, the initialization vector 304 can be a common vector that is used for each of the blocks. In some embodiments, the initialization vector can be a combination of a name of the artifact 302 and a version of the artifact 302.

The migration service can further use a counter 306 to generate a block value for each block of the artifact. The block value can be an identifier that is a non-repeating and sequential value assigned to each block. The block value can not only be used to generate a unique nonce for each block, but the counter can assign values for each block as they are disassembled from the artifact 302. In other words, the block values can correspond to an order, in which the blocks are to be reassembled by a target system to reform the artifact. The counter 306 can be a single global counter that assigns each of the block values, to not assign the same value to two blocks.

The migration service can use the initialization vector 304 and the respective block value assigned by the counter 306 to generate a nonce for each block. As illustrated, the migration service has generated three nonces, a block 1 nonce 308, a block 2 nonce 310, and a clock Z nonce 312. Each of the nonces is generated using the common initialization vector 304 and a unique block value. Therefore, each of the nonces can be different based on the block value. For example, each nonce can be a combination of the initialization vector and the respective block value. It should be appreciated that the initialization vector 304 can be a combination of the artifact name and artifact version. Therefore, even if the migration service is tasked with migrating two artifacts, the initialization vector for each can be different as they are based on the artifact names and versions. Therefore, even if the counter-generated block values for one artifact match counter-generated block values for another artifact, the nonces for each artifact will not match as the artifact names and versions will be different.

The migration service can perform the same downstream process for each block. The downstream process is described with more particularity with respect to FIG. 2. The migration service can use the downstream process to generate a block 1 hash 314 (which can be the same as block 1 hash 216 of FIG. 2), a block 2 hash 316, and a block Z hash 318.

The migration service can further combine the respective hashes to generate a combined hash. For example, the migration service can use an "exclusive or" (XOR) operation 320 to the respective hashes. The XOR operation 320 can be a binary operation, in which the migration service can use the hashes as inputs and generate an artifact hash 322. The XOR operation can be a bitwise operation, in which the migration service aligns the hash bits and evaluates corresponding bits. If all the corresponding bits are false (e.g., 0) or all the corresponding bits are true (e.g., 1), the XOR operation results in a false. If at least one bit is true and one bit is false, the XOR operation results in a true. The artifact hash 322 can be the output of the XOR operation 320. For example, consider block 1 hash 314, H(Block_1), the block 2 hash 316, H(Block_2), and the block Z hash 318, H(Block_Z). The migration service can combine the three hashes using an XOR operation, XOR (H(Block_1), H(Block_2), H(Block_Z)) to generate the artifact hash 322. The XOR operation is symmetric, and therefore the order of the elements (e.g., hash values) is lost for the artifact hash 322 during transmission from a source system to a target system.

It should be appreciated that the XOR operation can be described as having a communicative property, such that the order of the hashes in XOR operation can be rearranged without affecting resulting the artifact hash 322. For example, consider a situation in which the migration service generates three hashes: first hash (H(Block1)), second hash (H(Block2)), and third hash (H(Block3)). In one instance the migration service can perform an operation described as H(Block1) XOR H(Block2) XOR H(Block3) to obtain an artifact hash 322. In another instance, the migration service can perform an operation described as H(Block3) XOR H(Block1) XOR H(Block2) to obtain to obtain the same artifact hash 322 (e.g., H(Block1) XOR H(Block2) XOR H(Block3)==H(Block3) XOR H(Block1) XOR H(Block2). Therefore, a migration service can generate an artifact hash 322 without a predetermined order of the blocks and associated hashes.

The migration service can transmit the blocks, artifact hash 322, and an attestation to the target system. The target system can use the same hash function as the migration service and for each received block, generate a hash. The target system can further combine the generated hashes to generate an artifact hash. The target system can compare the artifact hash generated by the target system to the artifact hash 322 received from the migration service. If the artifact hashes match, the target system can proceed to compare the hashes for the individual blocks generated by the target system to the hashes for the individual blocks received from the migration service. If the artifact hash generated by the target system does not match the artifact hash 322 received from the migration service, the target system does not need to proceed to compare the hashes of the individual blocks. If the artifact hashes and the hashes of the individual blocks match, the target system verify the attestation from the source system and install the reassembled artifact at the target system. If the artifact hashes or the hashes of the individual blocks do not match, the target system can decline to verify the attestation from the source system.

In some embodiments, the migration service can take the output of the XOR operation 320 and apply a hash function 324 to generate the artifact hash 322. In other words, in these embodiments, the artifact hash 322 is not the output of the XOR operation 320. Rather the artifact hash 322 is the output of applying the hash function 324 to the output of the XOR operation 320. The migration service can use the same hash function 324 for the output of the XOR operation 320 as the hash function (e.g., hash function 214 of FIG. 2) that is used for the combined data instances. For example, the migration service can use a SHA-3 hash function to generate a hash value using a combined data instance as an input, and the SHA-3 hash function to generate a hash value using the output of the XOR operation 320 as an input.

Figure 4:
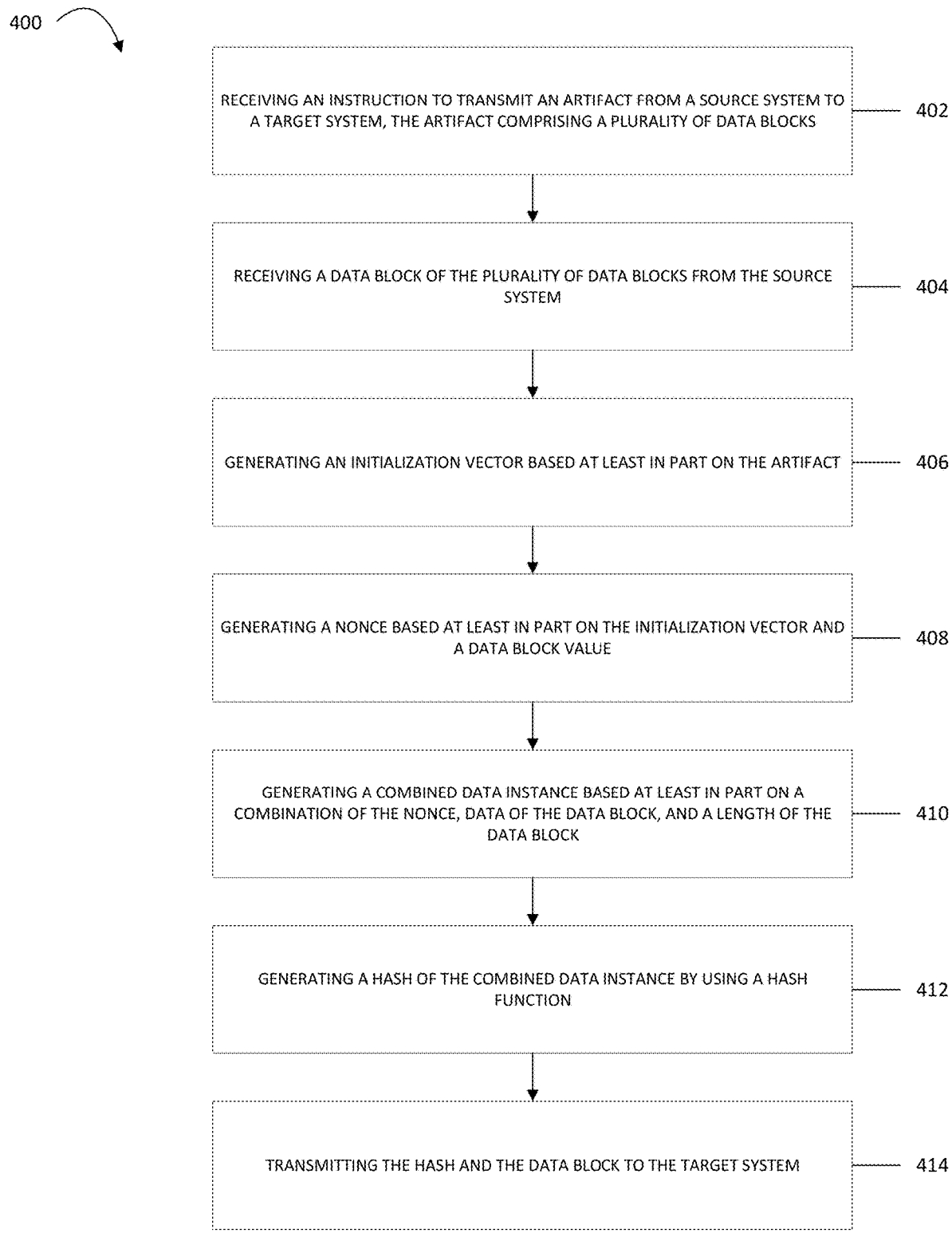
FIG. 4 is a process flow for a counter hash generation scheme, according to one or more embodiments.

FIG. 4 is a process 400 for a counter hash generation scheme, according to one or more embodiments. While the operations of processes 400 and 500 are described as being performed by generic computers, any suitable device (e.g., a migration service server, a source system, and a target system) may be used to perform one or more operations of these processes. Processes 400 and 500 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 402, the method can include a computing device receiving an instruction to transmit an artifact from a source system to a target system, the artifact comprising a plurality of data blocks. The computing device can be, for example, a server that provides software and hardware to support a service, such as a migration service. For example, a migration service can receive a customer request to migrate an artifact from one system to another system. Based on the customer's request, the migration service can receive control instructions to transmit the artifact from a source system to a control system. The control instructions can include an identity and address (e.g., virtual address, physical address) of the source system, an artifact name, and an artifact version. The control instructions can further include an identity and address of a target system and any formatting instructions for converting the artifact from a format of the source system to a format of the target system. The artifact can be a software package, a library, a zip file, or other file. In response to receiving the control instructions the computing device can initialize one or more virtual machine to assist with migrating the artifact from the source system to the target system.

At 404, the method can include the computing device receiving a data block of the plurality of data blocks from the source system. The artifact may be too large to transmit all at once, and therefore the artifact can be divided into data blocks that can each be transmitted in parallel to the target system. The data blocks can be divided into blocks of equal size (e.g., integer multiples of 512 bits). Each virtual machine initialized by the computing device can process one or more data blocks.

At 406, the method can include the computing device generating an initialization vector based at least in part on the artifact. The initialization vector can be a random or pseudorandom number that can be used to generate a hash. In some instances, the initialization vector can be a combination of the artifact name and artifact version. The artifact name can be a value that identifies the artifact. The artifact version can be a date that the artifact was last modified. In some instances, the initialization vector can be a concatenation of the artifact name and artifact version.

At 408, the method can include the computing device generating a nonce based at least in part on the initialization vector and a data block value, each data block of the plurality of data blocks can be assigned a respective block value by a counter. The counter can be a global counter that assigns data block values for all the data blocks. Each block value can be a non-repeating and unique value assigned to each block. The data block value can further correspond to an order by which the data blocks are disassembled and are to be reassembled. In some instances, the nonce can be based on a combination of the initialization vector and the data block value. For example, the nonce can be a concatenation of the initialization vector and the data block value.

At 410, the method can include the computing device generating a combined data instance based at least in part on a combination of the nonce, data of the data block, and a length of the data block. The nonce, the data block can be represented as a sequence of bits. The length of the data block can be the number of bits, which can also be represented as a sequence of bits. The nonce, the data of the data block, and the length of the data block can all be represented as a combined sequence of bits. For example, the computing device can concatenate the sequence of bits representing the nonce, the sequence of bits representing the data of the data block, and the sequence of bits representing the length of the data block. The combined sequence of bits can be a combined data instance.

At 412, the method can include the computing device generating a hash of the combined data instance by using a hash function. The computing device can employ a hash function that can map an input (e.g., combined data instance) to an output (e.g., hash). The hash function can be deterministic, such that using the same input always maps to the same output. Conversely, using different inputs for the hash functions can lead the hash function to map to different outputs. Therefore, both the source system and the target system can use the combined data instance as an input for the hash function and receive the same output. This way the target system can determine whether an attestation received from the source system as to the integrity of the artifact is verified.

At 414, the method can include the computing device transmitting the hash and the data block to the target system. The hash and the data block can be one hash and one data block of plurality of hashes and data blocks that when combined, can reform the artifact at the target system.

Figure 5:
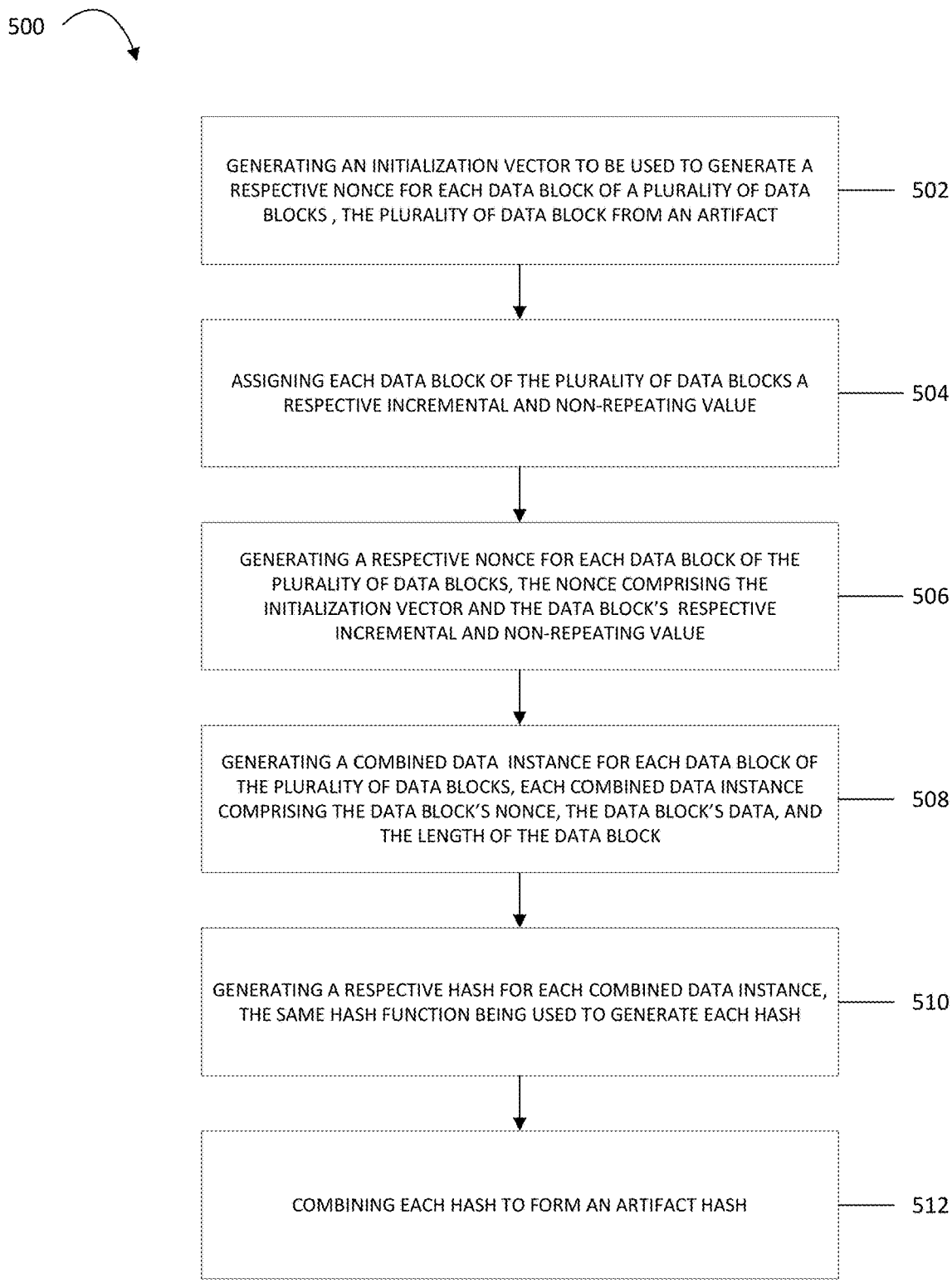
FIG. 5 is a process flow for a counter hash generation scheme, according to one or more embodiments.

FIG. 5 is a process 500 for a counter hash generation scheme, according to one or more embodiments. A migration service can receive instructions to migrate an artifact from a source system to a target system. The artifact can be divided into data blocks to more easily transmit the artifact to the target system. The artifact can be disassembled into data blocks in a particular order (e.g., based on memory addresses) and the data blocks can be reassembled at the target system in that order. At 502, the method can include a migration service generation an initialization vector to be used to generate a respective nonce for each data block. The initialization vector can be a random or pseudorandom number that is based on a combination of the artifact's name and version.

At 504, the method can include the migration service assigning each data block of the plurality of data blocks a respective value. The migration service can employ a global counter that can generate the value for each block. This number, rather than hashing information from another data block can be used to distinguish the data block from other data blocks. This number also permits the migration service to process blocks out of order, rather than in a sequence. Therefore, the migration service is not waiting for hashing information from another block to process an instant block. However, at the target system, the value can be used to determine the sequence by which the blocks were disassembled from the artifact, and the sequence by which they are to be reassembled.

At 506, the method can include the migration service generating a respective nonce for each data block of the plurality of data blocks. The nonce can include the initialization vector (e.g., the initialization vector generated at step 502) and the data blocks respective value (e.g., a value generated at step 504). Each data block can include its own nonce. The nonce can be used to distinguish one data block from another data block.

At 508, the method can include the migration service generating a combined data instance for each data block of the plurality of data blocks. Each combined data instance can include the data block's nonce (e.g., a nonce generated at step 506), the data of the respective data block, and a length of the respective data block.

At 510, the method can include the migration service generating a respective hash for each combined data instance (e.g., a combined data instance generated at step 508). The migration service can use a hash function to map an input (e.g., combined data instance) to an output (hash). As each combined data instance includes a different nonce based on the value, the hash function can generate a different hash for each combined data instance.

At 512, the method can include the migration service combining each hash (e.g., a hash generated at step 510) to generate an artifact hash. For example, the migration service can use the hashes as inputs for an XOR function. The output of the XOR function can be the artifact hash. The migration service can then transmit the blocks, hashes, and artifact hash to the target system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
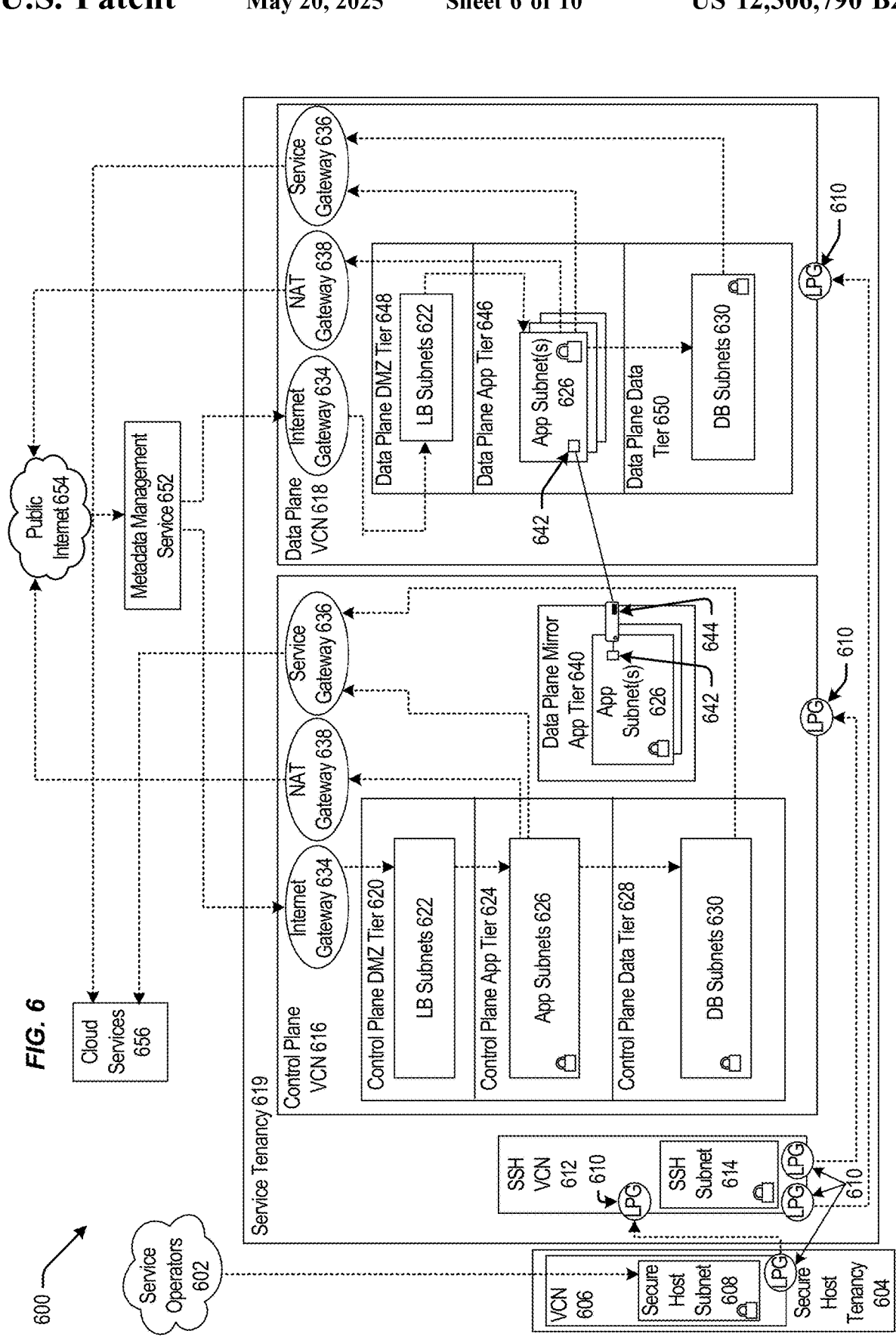
FIG. 6 is a block diagram illustrating one pattern for implementing a cloud infrastructure as a service system, according to one or more embodiments.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
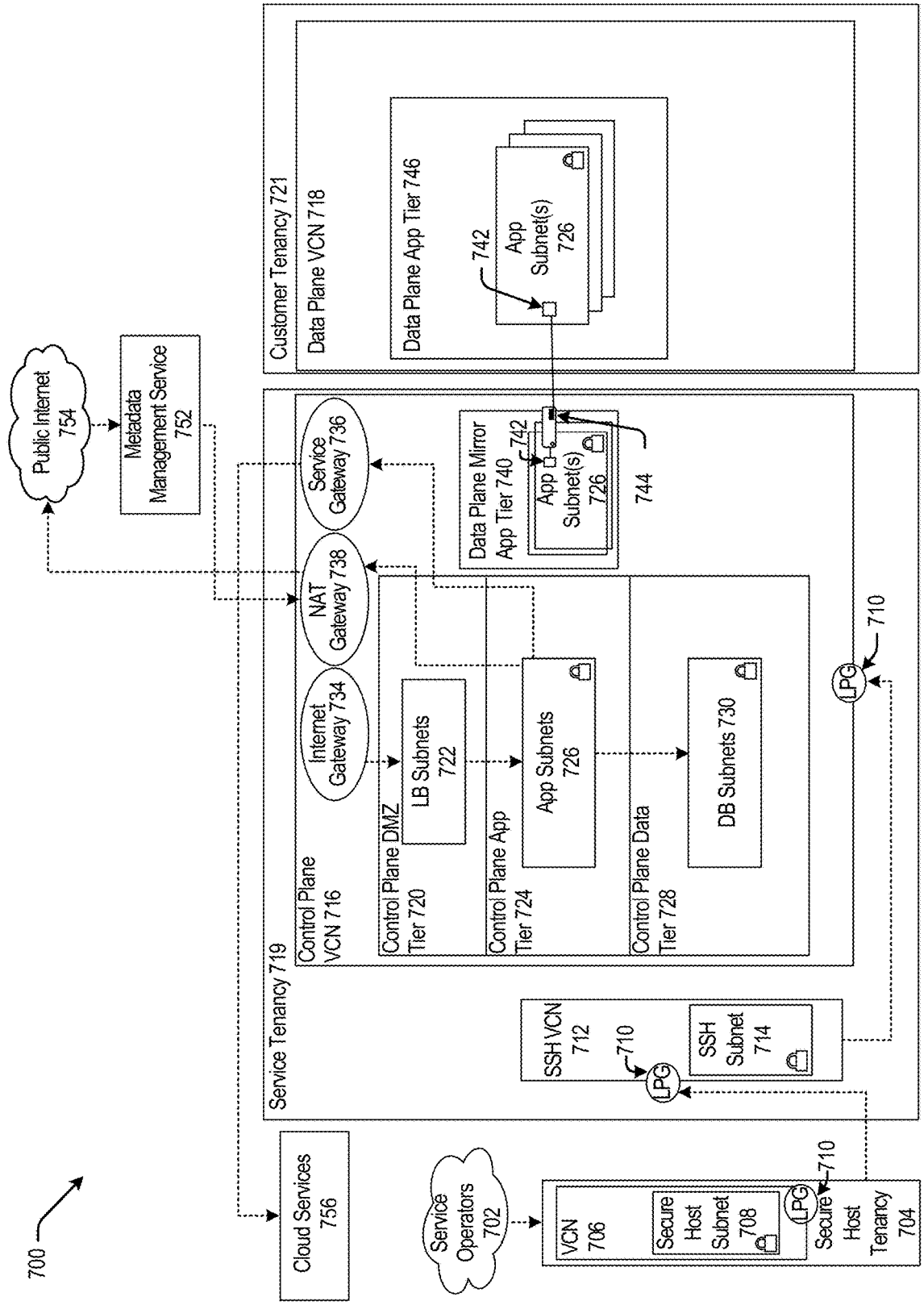
FIG. 7 is a block diagram illustrating another pattern for implementing a cloud infrastructure as a service system, according to one or more embodiments.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG.

6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
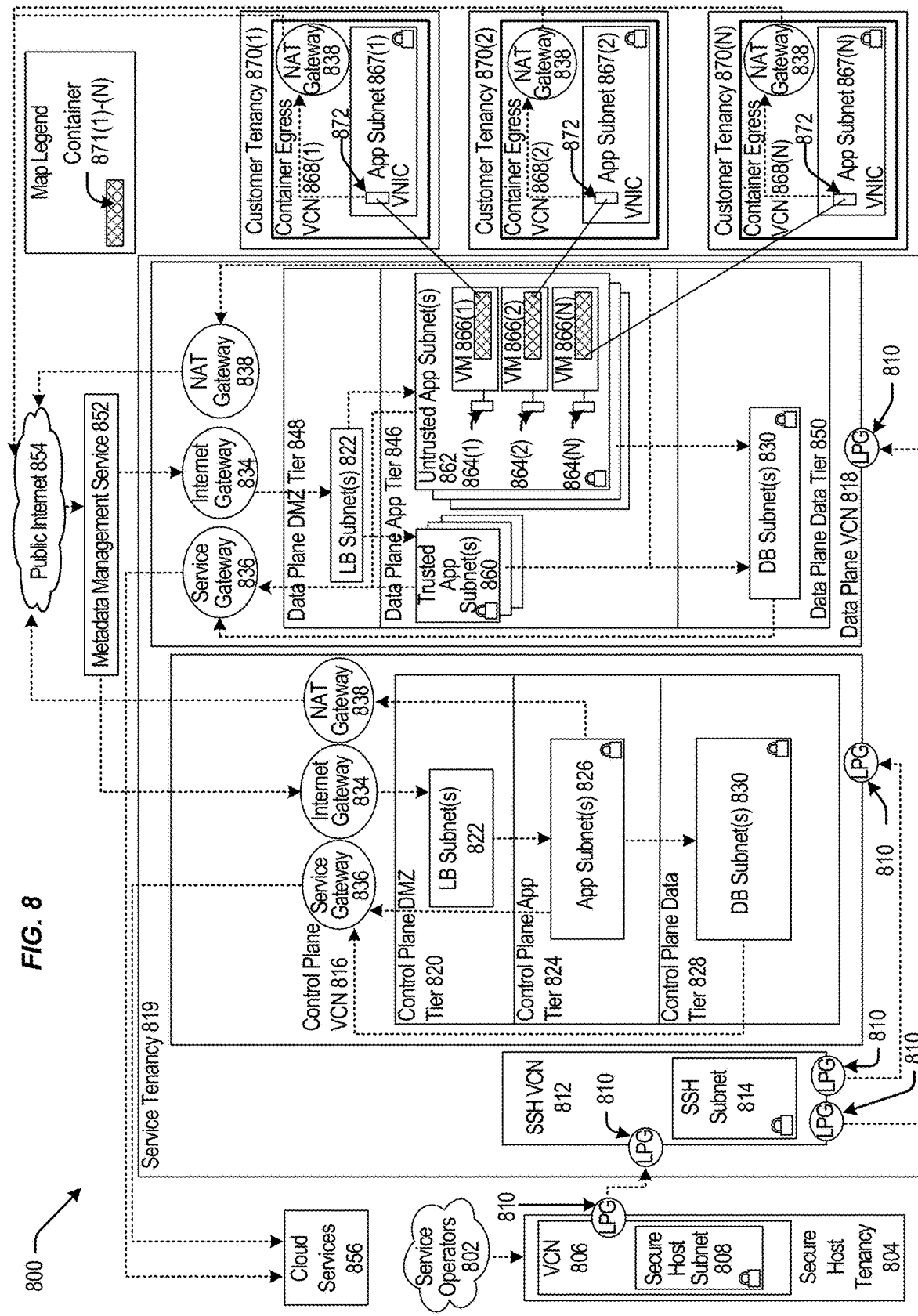
FIG. 8 is a block diagram illustrating another pattern for implementing a cloud infrastructure as a service system, according to one or more embodiments.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824

(e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
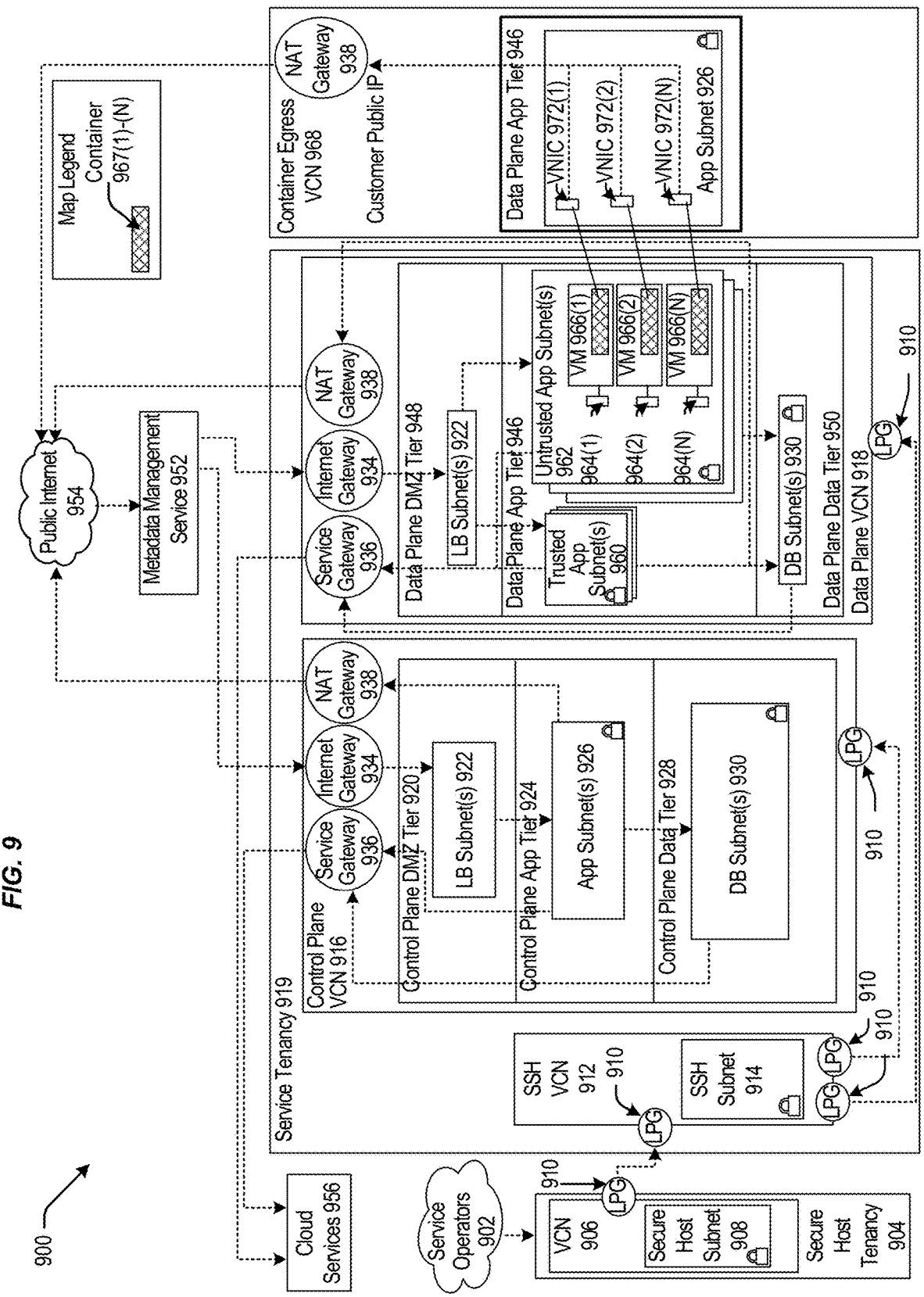
FIG. 9 is a block diagram illustrating another pattern for implementing a cloud infrastructure as a service system, according to one or more embodiments.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
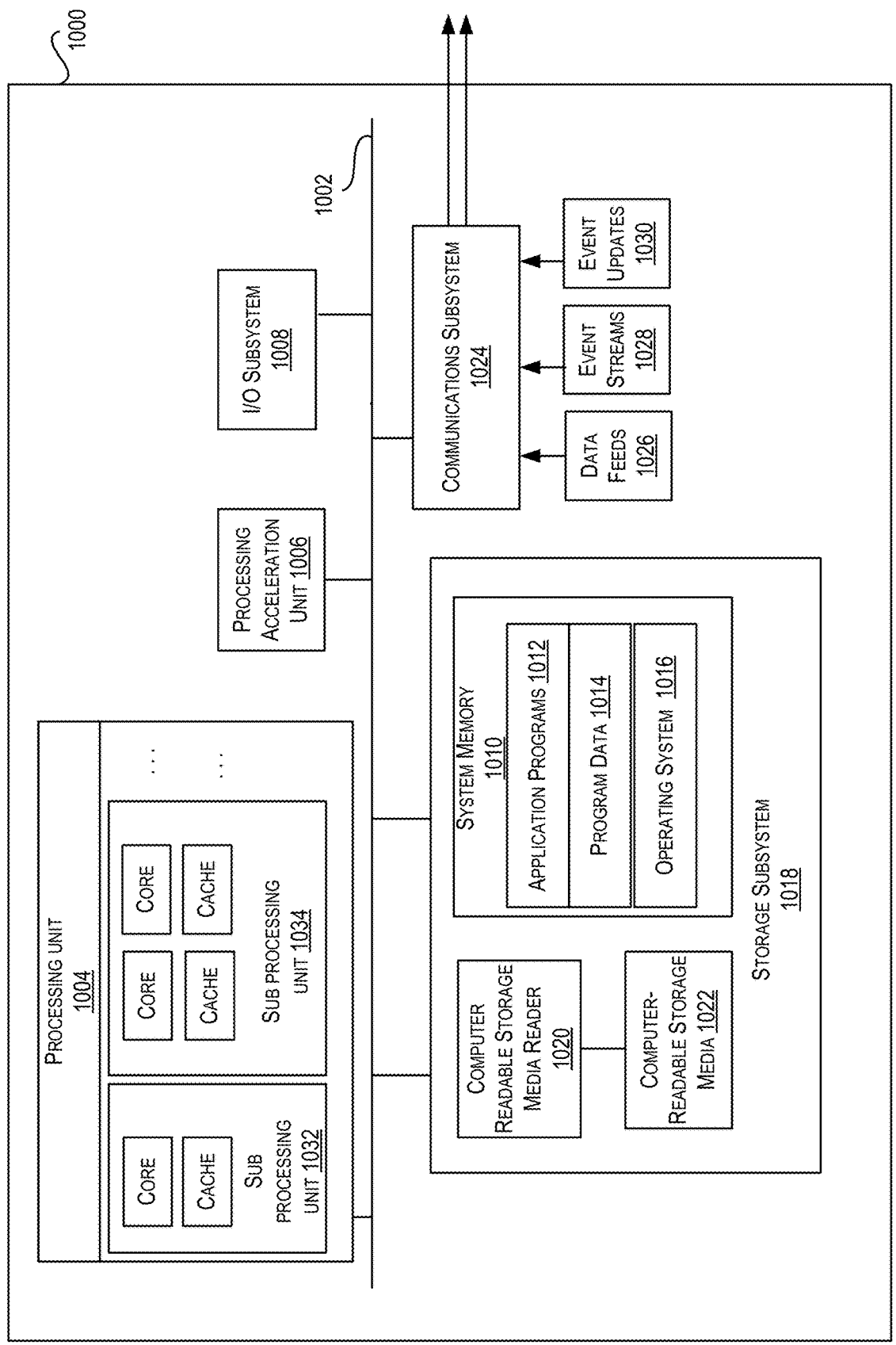
FIG. 10 is a block diagram illustrating an example computer system, according to one or more embodiments.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1018 may also provide a tangible computer-readable storage medium for storing the basic programming and data constructs that provide the functionality of some embodiments. Software (programs, code services, instructions) that when executed by a processor provide the functionality described above may be stored in storage subsystem 1018. These software services or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing device, an instruction to transmit an artifact from a source system to a target system, the artifact comprising a plurality of data blocks, and the artifact to be transmitted to the target system as separate data blocks;
   receiving, by the computing device, a data block of the plurality of data blocks from the source system;
   generating, by the computing device, an initialization vector based at least in part on the artifact, the initialization vector to be used to generate respective nonces for each data block of the plurality of data blocks;
   generating, by the computing device, a first nonce of the respective nonces based at least in part on the initialization vector and a data block value, each data block of the plurality of data blocks being assigned a respective data block value by a counter;
   generating, by the computing device, a combined data instance based at least in part on a combination of the first nonce, data of the data block, and a length of the data block;
   generating, by the computing device, a hash of the combined data instance by using a hash function; and
   transmitting, by the computing device, the hash and the data block to the target system to reconstruct the artifact based at least in part on the hash and the data block.

2. The method of claim 1, wherein the data block is a first data block of the plurality of data blocks, wherein the data block value is a first data block value, wherein the combined data instance is a first combined data instance, and wherein the method further comprises:
   generating a second combined data instance by combining a second nonce, a data of a second data block, and a length of the second data block, wherein the plurality of data blocks comprises the second data block; and
   generating a hash of the second combined data instance by using the hash function, wherein generating the hash of the second combined data instance is irrespective of generating the hash of the first combined data instance.

3. The method of claim 2, wherein the method further comprises:
   generating a value based at least in part on executing an "exclusive or" (XOR) on the hash of the first combined data instance and the hash of the second combined data instance; and
   transmitting the value to the target system.

4. The method of claim 3, wherein the method further comprises:
   generating a value based at least in part on executing an "exclusive or" (XOR) on the hash of the first combined data instance and the hash of the second combined data instance;
   generating a hash of the value by using the hash function; and
   transmitting the hash of the value to the target system.

5. The method of claim 1, wherein generating of the initialization vector comprises concatenating an identifier of the artifact and a version of the artifact.

6. The method of claim 1, wherein generating the first nonce comprises concatenating the data block value and the initialization vector.

7. The method of claim 1, wherein the hash function is a secure hash algorithm (SHA).

8. A computing device, comprising:
   a processor; and
   a computer-readable medium including instructions that, when executed by the processor, cause the processor to perform operations comprising:
      receiving an instruction to transmit an artifact from a source system to a target system, the artifact comprising a plurality of data blocks, and the artifact to be transmitted to the target system as separate data blocks;
      receiving a data block of the plurality of data blocks from the source system;
      generating an initialization vector based at least in part on the artifact, the initialization vector to be used to generate respective nonces for each data block of the plurality of data blocks;
      generating a nonce based at least in part on the initialization vector and a data block value, each data block of the plurality of data blocks being assigned a respective data block value by a counter;
      generating a combined data instance based at least in part on a combination of the first nonce, data of the data block, and a length of the data block;
      generating a hash of the combined data instance by using a hash function; and
      transmitting the hash and the data block to the target system to reconstruct the artifact based at least in part on the hash and the data block.

9. The computing device of claim 8, wherein the data block is a first data block of the plurality of data blocks, wherein the data block value is a first data block value, wherein the combined data instance is a first combined data instance, and wherein the instructions that, when executed by the processor, further cause the processor to perform operations comprising:
   generating a second combined data instance by combining a second nonce, a data of a second data block, and a length of the second data block, wherein the plurality of data blocks comprises the second data block; and
   generating a hash of the second combined data instance by using the hash function, wherein generating the hash of the second combined data instance is irrespective of generating the hash of the first combined data instance.

10. The computing device of claim 9, wherein the instructions that, when executed by the processor, further cause the processor to perform operations comprising:
   generating a value based at least in part on executing an "exclusive or" (XOR) on the hash of the first combined data instance and the hash of the second combined data instance; and
   transmitting the value to the target system.

11. The computing device of claim 10, wherein the instructions that, when executed by the processor, further cause the processor to perform operations comprising:
   generating a value based at least in part on executing an "exclusive or" (XOR) on the hash of the first combined data instance and the hash of the second combined data instance;
   generating a hash of the value by using the hash function; and
   transmitting the hash of the value to the target system.

12. The computing device of claim 8, wherein generating of the initialization vector comprises concatenating an identifier of the artifact and a version of the artifact.

13. The computing device of claim 8, wherein generating the first nonce comprises concatenating the data block value and the initialization vector.

14. The method of claim 1, wherein the hash function is a secure hash algorithm (SHA).

15. A non-transitory computer-readable medium having stored thereon a sequence of instructions that, when executed by a processor, causes the processor to perform operations comprising:
   receiving an instruction to transmit an artifact from a source system to a target system, the artifact comprising a plurality of data blocks, and the artifact to be transmitted to the target system as separate data blocks;
   receiving a data block of the plurality of data blocks from the source system;
   generating an initialization vector based at least in part on the artifact, the initialization vector to be used to generate respective nonces for each data block of the plurality of data blocks;
   generating a nonce based at least in part on the initialization vector and a data block value, each data block of the plurality of data blocks being assigned a respective data block value by a counter;
   generating a combined data instance based at least in part on a combination of the nonce, data of the data block, and a length of the data block;
   generating a hash of the combined data instance by using a hash function; and
   transmitting the hash and the data block to the target system to reconstruct the artifact based at least in part on the hash and the data block.

16. The non-transitory computer-readable medium of claim 15, wherein the data block is a first data block of the plurality of data blocks, wherein the data block value is a first block value, wherein the combined data instance is a first combined data instance, and wherein the instructions that, when executed by the processor, further cause the processor to perform operations comprising:
   generating a second combined data instance by combining a second nonce, a data of a second data block, and a length of the second data block, wherein the plurality of data blocks comprises the second data block; and
   generating a hash of the second combined data instance by using the hash function, wherein generating the hash of the second combined data instance is irrespective of generating the hash of the first combined data instance.

17. The non-transitory computer-readable medium of claim 16, wherein the instructions that, when executed by the processor, further cause the processor to perform operations comprising:

generating a value based at least in part on executing an "exclusive or" (XOR) on the hash of the first combined data instance and the hash of the second combined data instance; and transmitting the value to the target system.

18. The non-transitory computer-readable medium of claim 17, wherein the instructions that, when executed by the processor, further cause the processor to perform operations comprising:

generating a value based at least in part on executing an "exclusive or" (XOR) on the hash of the first combined data instance and the hash of the second combined data instance;

generating a hash of the value by using the hash function; and transmitting the hash of the value to the target system.

19. The non-transitory computer-readable medium of claim 15, wherein generating of the initialization vector comprises concatenating an identifier of the artifact and a version of the artifact.

20. The non-transitory computer-readable medium of claim 15, wherein generating the first nonce comprises concatenating the data block value and the initialization vector.

* * * * *

UNITED STATES PATENT AND TRADEMARK OFFICE
CERTIFICATE OF CORRECTION

PATENT NO. : 12,306,790 B2
APPLICATION NO. : 18/081285
DATED : May 20, 2025
INVENTOR(S) : Dockter Page 1 of 1

It is certified that error appears in the above-identified patent and that said Letters Patent is hereby corrected as shown below:

On the Title Page

Column 1, under item (71) applicant, Line 1, delete "Corpration," and insert -- Corporation, --, therefor.

In the Specification

In Column 3, Line 41, delete "systems" and insert -- systems. --, therefor.

Signed and Sealed this
Twelfth Day of August, 2025

Coke Morgan Stewart
*Acting Director of the United States Patent and Trademark Office*